March 6, 1956    N. DE FRUMERIE ET AL    2,737,402
MEANS FOR MUTUAL CENTERING AND CONNECTING
PAIRS OF AXIALLY ALIGNED TUBE ELEMENTS
Filed June 28, 1955
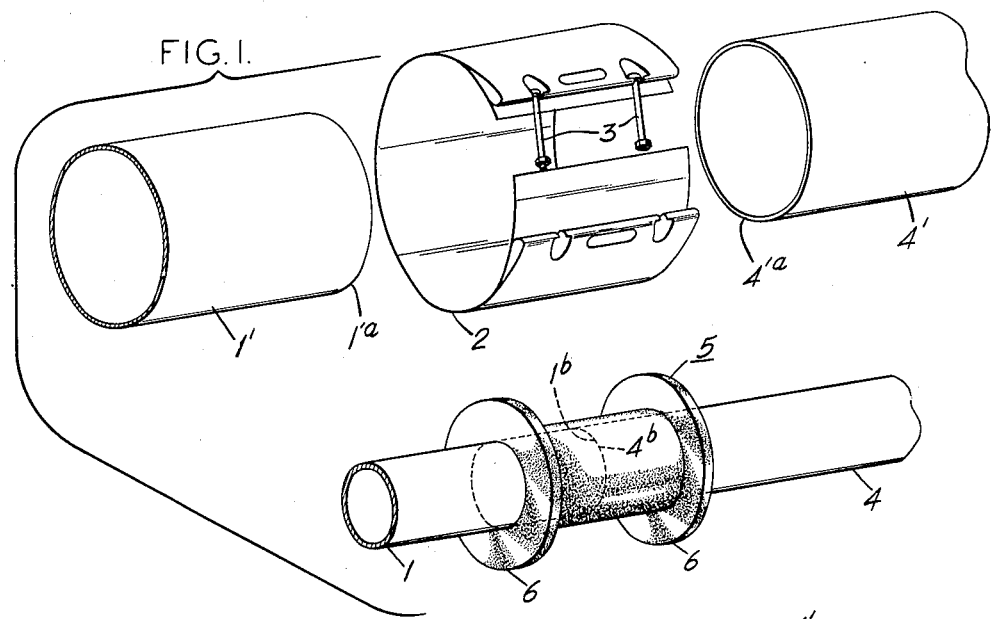
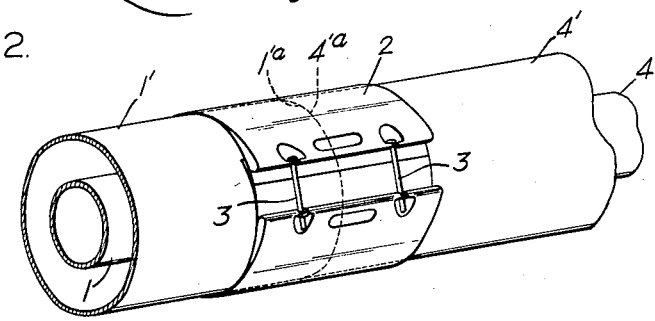
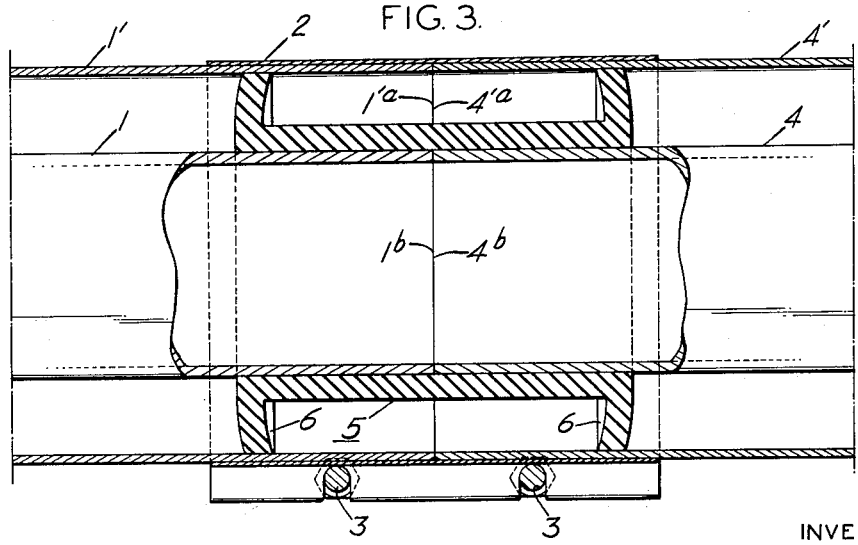
INVENTORS.
NILS DE FRUMERIE
EVERT SAMUELSSON
BY Howson & Howson
ATTYS

United States Patent Office 2,737,402
Patented Mar. 6, 1956

2,737,402

MEANS FOR MUTUAL CENTERING AND CONNECTING PAIRS OF AXIALLY ALIGNED TUBE ELEMENTS

Nils De Frumerie, Goteborg, and Evert Samuelsson, Jonkoping, Sweden, assignors to Aktiebolaget Svenska Flaktfabriken, Stockholm, Sweden Application June 28, 1955, Serial No. 518,588

Claims priority, application Sweden July 1, 1954

1 Claim. (Cl. 285—22)

The present invention relates to a means for mutual centering and connecting of a pair of axially aligned tube elements for pipe lines, consisting of two concentric tubes. In pipe systems intended for transport of gaseous media or liquids, double mantled pipes are often used for utilizing of the interspaced layer of air as insulation. In order to obtain a uniform and effective insulation it is necessary to fix the distance between the two pipe mantles and also to prevent air circulation in the length direction of the pipes by inserting annular partitions. It is an object of the present invention to make it possible to perform the above by simple means and also to obtain an effective joining of the parts.

The means according to the invention is characterized in that a sleeve of elastic material is fitted over each of the abutting ends of the inner tubes, the sleeve being equipped with flanges at its ends which flanges function as spacing means between the concentric tubes, the corresponding ends of the outer tubes then being fitted over said sleeve towards each other, and that finally the joint between the tubes is covered by a clamping sleeve equipped with stressing bolts to ensure a sealed joint between the parts.

The invention will now be closely described in connection with the accompanying drawing where Fig. 1 shows the elements to be joined, Fig. 2 shows the ready connection, Fig. 3 is a sectional view through the assembled connection.

In the drawing figures 1b and 4b designate the abutting ends of two inner tubes 1 and 4 respectively. 5 designates a sleeve of elastic material preferably coutshouc or similar material having a low heat transmission coefficient and equipped with two flanges 6, one at each end of the sleeve. This sleeve is in Fig. 1 shown fitted over the said tube ends 1b and 4b. In the same manner 1'a and 4'a designate the ends of the outer tubes 1' and 4'. 2 designates an exemplifying embodiment of a clamping sleeve equipped with stressing bolts 3 for pressing the clamping sleeve around the parts of the tubes as illustrated in Fig. 2.

The flanges of the sleeve are to be made with somewhat greater outer diameter than the inner diameter of the outer tubes. Thus a double sealing will be obtained between the medium in the inner pipeline and the atmosphere surrounding this pipe system and this result will be possible to obtain without any special sealing material. This is a great advantage with respect to the fact that the pipes often must be mounted in narrow spaces or passages where outer sealing means and desired adjustments are difficult to arrange.

In the shown embodiment the tubes have circular cross sections but evidently the invention is not to be limited to connections between pipes of this shown cross section.

What we claim is:

A means for mutual centering and connecting pairs of concentric and axially aligned and abutting tube elements comprising a sleeve of elastic material fitted over each of the abutting ends of the inner tubes, the sleeve being equipped with flanges at its ends which flanges function as spacing means between the inner pair of tubes and the outer pair of abutting concentric tubes, the corresponding ends of the outer tubes being fitted over said sleeve towards each other, the joint between the outer tubes being covered by a clamping sleeve equipped with stressing bolts to ensure a tight joint between the parts.

References Cited in the file of this patent

UNITED STATES PATENTS

| 211,387 | Driesslein | Jan. 14, 1879 |
| 649,916 | Dietrich | May 22, 1900 |
| 2,369,849 | Phillips | Feb. 20, 1945 |

FOREIGN PATENTS

| 942,923 | France | Sept. 27, 1948 |